(12) United States Patent  (10) Patent No.: US 8,515,204 B2
Clédière  (45) Date of Patent: Aug. 20, 2013

(54) CORRECTING DEFECTS IN AN IMAGE

(75) Inventor: Sébastien Clédière, Montpellier (FR)

(73) Assignee: Snell Limited, Reading (GB)

( * ) Notice: Subject to any disclaimer, the term of this patent is extended or adjusted under 35 U.S.C. 154(b) by 444 days.

(21) Appl. No.: 12/858,251

(22) Filed: Aug. 17, 2010

(65) Prior Publication Data

US 2011/0044558 A1  Feb. 24, 2011

(30) Foreign Application Priority Data

Aug. 21, 2009 (GB) .................................. 0914638.2

(51) Int. Cl.
*G06K 9/40* (2006.01)

(52) U.S. Cl.
USPC ............................. 382/275; 382/266; 382/274

(58) Field of Classification Search
USPC ......................................................... 382/275
See application file for complete search history.

(56) References Cited

U.S. PATENT DOCUMENTS

| 5,544,256 | A | | 8/1996 | Brecher et al. |
|---|---|---|---|---|
| 5,920,356 | A | * | 7/1999 | Gupta et al. .................. 348/606 |
| 6,229,578 | B1 | * | 5/2001 | Acharya et al. ............... 348/607 |
| 2001/0021035 | A1 | * | 9/2001 | Takashimizu .................. 358/1.9 |
| 2002/0191859 | A1 | | 12/2002 | Amano et al. |
| 2005/0195297 | A1 | * | 9/2005 | Kita ............................... 348/246 |
| 2006/0072844 | A1 | | 4/2006 | Wang et al. |
| 2008/0170158 | A1 | * | 7/2008 | Jung et al. ..................... 348/581 |
| 2010/0278422 | A1 | * | 11/2010 | Iketani ........................... 382/165 |

FOREIGN PATENT DOCUMENTS

| CN | 1567977 | 1/2005 |
|---|---|---|
| GB | 2370932 | 7/2002 |
| JP | 2007005972 | 1/2007 |

OTHER PUBLICATIONS

Great Britain Application No. 0914638.2 Search Report dated Dec. 14, 2009, (3 pages).
Ranjbar, M. et al., "Spatial error concealment: A novel exemplar-based approach using segmentation" Computers & Electrical Engineering, Sep. 9, 2008.
Chen, Y. Y. et al., "Design a deblocking filter with three separate modes in DCT-based coding" Journal of Visual Communication and Image Representation, Academic Press, Inc, Feb. 29, 2008.
Kokaram, A. C., "On Missing Data Treatment for Degraded Video and Film Archives: A Survey and a New Bayesian Approach" IEEE Transactions on Image Processing, IEEE Service Center, Mar. 2004 (19 pages).
EP 10172833 Extended European Search Report dated Oct. 14, 2010 (3 pages).

* cited by examiner

*Primary Examiner* — Amir Alavi
*Assistant Examiner* — Kenny Cese
(74) *Attorney, Agent, or Firm* — Michael Best & Friedrich LLP

(57) ABSTRACT

A method of correcting dirt or other defects in video or other images in which a region is provisionally corrected, an accumulated gradient measure formed along the periphery of the region with and without correction and the region corrected or not depending on a comparison of the gradient measures.

9 Claims, 4 Drawing Sheets

CORRECTING DEFECTS IN AN IMAGE

CROSS-REFERENCE TO RELATED APPLICATION

This application claims priority to Great Britain Patent Application No. 0914638.2 filed Aug. 21, 2009, the entire contents of which is herein incorporated by reference.

FIELD OF INVENTION

This invention concerns the processing of images to correct defects occurring in transmission or storage and, in a particular example, the control of an image restoration or other correction process.

BACKGROUND OF THE INVENTION

Electronic restoration of damaged or decayed motion film images is well known and techniques exist for correcting a variety of different types of artefact, including those due to scratches on, and particles of dirt adhering to, the film surface. Typically such processes include a detector for identifying the location of a particular type of artefact, such as the shadow of a dirt particle on a particular film frame; and, a correction process that 'repairs' the image, for example by substituting information from an earlier or later film frame at the location of the detected artefact.

The process of artefact detection may be prone to errors, and genuine image features may be mistaken for artefacts. For example a small, fast-moving object may be confused with a patch of dirt on a single frame. It can often be impossible to adjust the sensitivity of the artefact detection process to ensure that all relevant artefacts are detected and no 'false alarms' are raised. This latter problem can cause additional artefacts to be introduced by inappropriate alteration or replacement of part of an image.

The inventor has appreciated that inappropriate operation of an image correction process can be detected and consequent unnecessary correction prevented, thus allowing a higher-sensitivity detection process to be used with the advantage that more of the 'genuine' defects are corrected.

SUMMARY OF THE INVENTION

The invention consists in a method and apparatus for correcting defects in a representation of an image in which the application of an image correction process to a region within the image is controlled by a gradient measure evaluated over the periphery of the said region within the said image.

Suitably the said measure is evaluated for a corrected image region and for the same region of the same image without correction and the application of correction to that region is controlled by the result of a comparison between the said measure for the corrected region and the said measure for the uncorrected region.

In a preferred embodiment the said image correction process is inhibited in regions where the said gradient measure for a corrected image would be higher than the said measure for the same region in the uncorrected image.

And, the said gradient measure is a sum of pixel value magnitude differences between pixels at the edge of the said region and respective adjacent pixels outside the said region.

BRIEF DESCRIPTION OF THE DRAWINGS

An example of the invention will now be described with reference to the drawings in which.

DETAILED DESCRIPTION OF THE INVENTION

Figure 1:
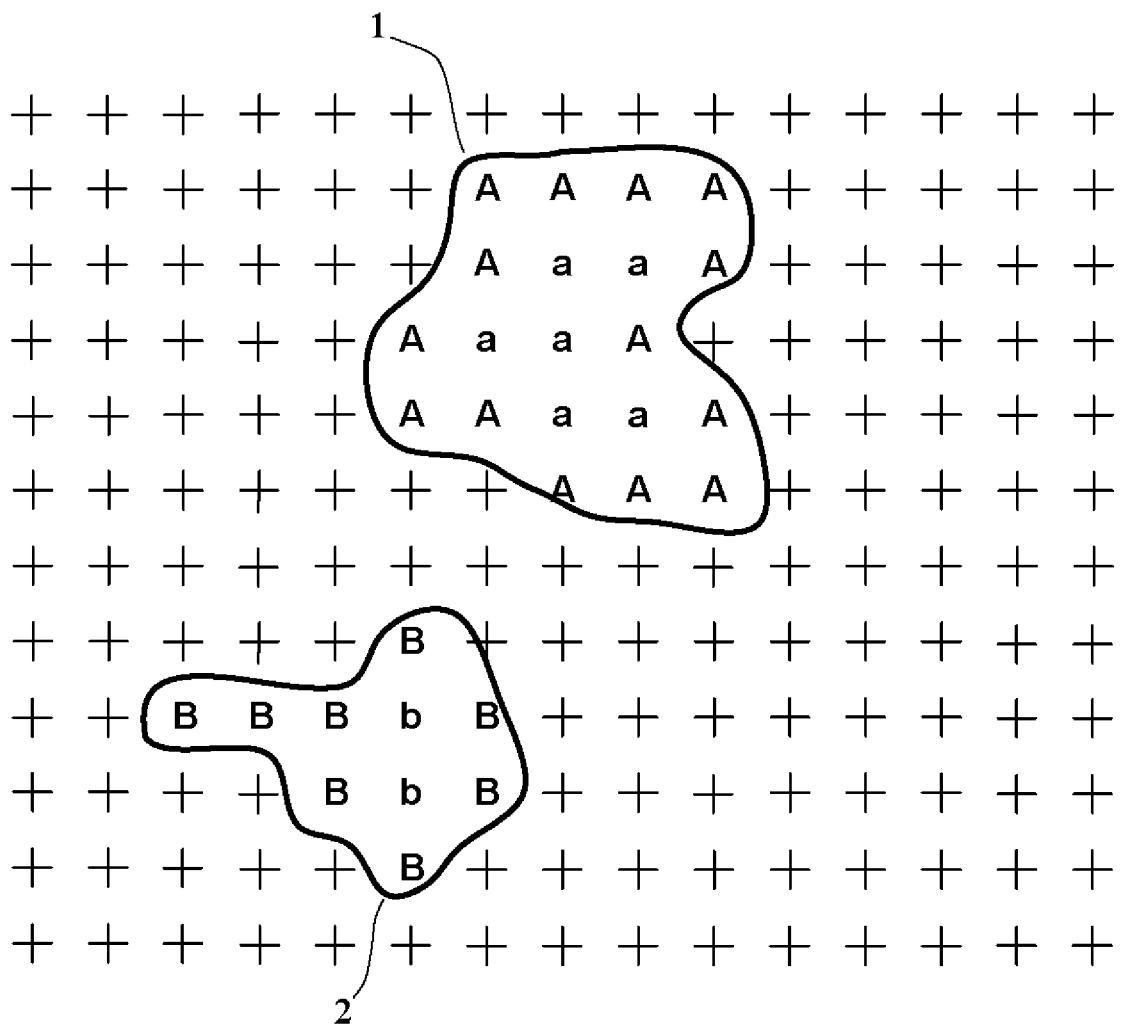
FIG. 1 shows an array of pixels forming part of an image which have been classified according to membership of two discrete regions within the image.

The described approach is to analyse the gradient represented by pixels at the periphery of a corrected image region in order to evaluate the efficacy of the correction process in that region. This is illustrated in FIG. 1 which shows an array of pixels within an image, for example a single film frame or a video field derived from a film frame. Two separate areas within the illustrated image area have been modified by some correction process; the extents of these areas are shown by the outlines (1) and (2). The groups of pixels within either of these outlines may have been obscured by respective patches of dirt on the corresponding film frame, or, alternatively, either or both of the groups of pixels may represent respective image features that have been incorrectly identified as dirt patches by the correction process.

The process of the invention analyses each region separately and so the corrected pixels must be allocated to discrete regions. Thus, in FIG. 1, all the pixels within the outline (1) have been designated with the letter A or a; and all the pixels within the outline (2) have been designated with the letter B or b. In the preferred embodiment only the peripheral pixels are used in the analysis, i.e. those pixels having a vertical or horizontal neighbour lying outside the region. These are the pixels designated with upper case letters (A or B) in FIG. 1. Thus the region within the outline (1) is evaluated by analysis of the pixels A; and the region within the outline (2) is evaluated by analysis of the pixels B.

Figure 2:
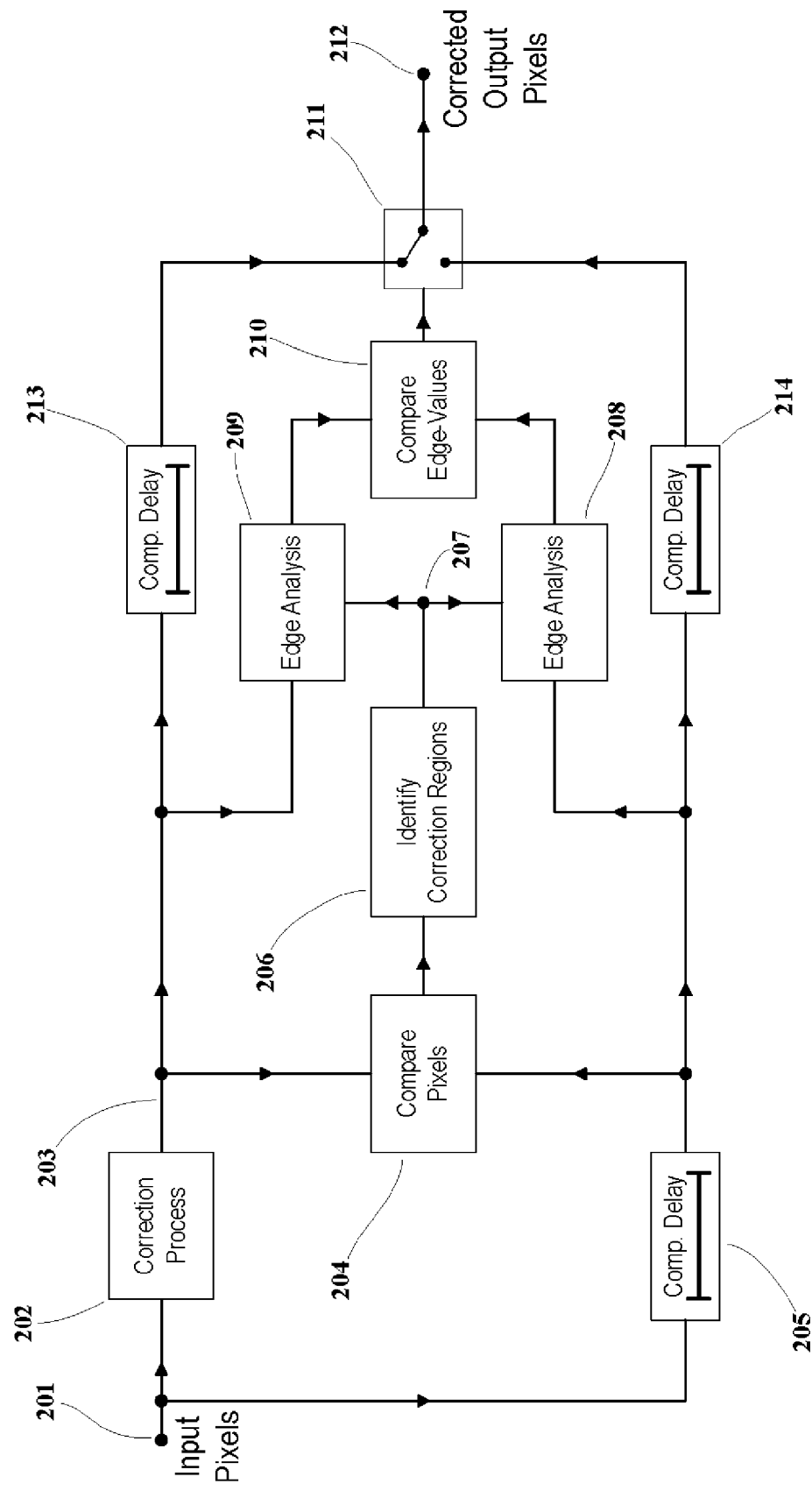
FIG. 2 shows a block diagram of an image correction system according to an embodiment of the invention.

A suitable system is shown in FIG. 2. Referring to FIG. 2 a stream of pixels that describes an image, or a sequence of related images, is received at an input (201). These input pixels are processed in a correction process (202) that modifies the input pixels in order to eliminate artefacts; for example, areas obscured by dirt particles or scratches. The modified pixels (203) at the output of the correction process (202) are compared with the input pixels in a pixel-comparator (204). Each pixel from the input (201) is compared with the corresponding modified pixel (203); typically this will require the input pixels to be delayed in a compensating delay (205) so that corresponding pixels are presented simultaneously at the two inputs of the pixel-comparator (204). If the input (201) represents a sequence of film frames, then it is likely that the compensating delay (205) will need to be at least two frames long so as to ensure that the pixel-comparator (204) compares pixels that represent the same point in space and time.

The pixel-comparator (204) identifies those pixels that have been changed by the correction process (202). This can be achieved by taking the difference between pixel values, typically luminance value differences, though any convenient measure that is affected by the correction process (202) can be used.

Having identified the pixels that have been corrected, they must be allocated to regions for analysis. The result from the pixel-comparator (204) is passed to a correction-region identification block (206), which identifies (for each separate image) every spatially-separated, contiguous region of modified pixels. The identification block (206) outputs correction-region data (207) that defines the constituent pixels of each spatially-separate, corrected region of the current image being processed.

Figure 3:
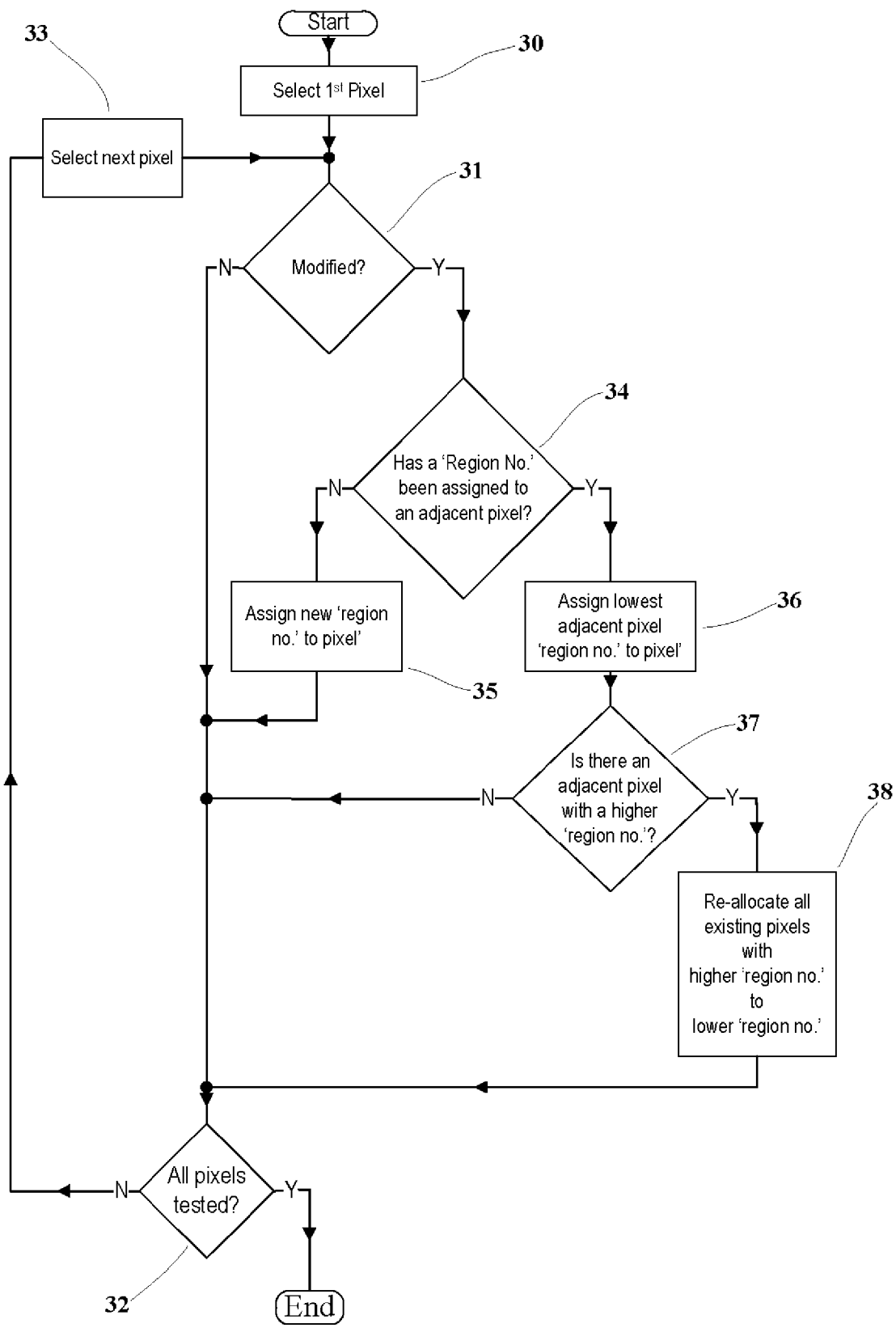
FIG. 3 shows a flow chart of a process for allocating pixels to discrete regions.

A suitable method is shown in the flow chart of FIG. 3. The pixels of the image are assessed in turn in some convenient order, for example a conventional raster-scan from top-left to bottom-right. In step (30) the first pixel is selected for analysis, in step (31) it is tested to see if it has been modified by the correction process (for example by examining the relevant output from the comparator (204) in FIG. 2). If it has not been modified, a test is made in step (32) to see whether all pixels have been assessed, and if not, the next pixel is selected for analysis in step (33).

Once the first modified pixel is found, a test is made in step (34) to see if any horizontally or vertically adjacent pixel has been allocated to a region. In the case of the first modified pixel to be evaluated no adjacent pixels will have been allocated, and the processing moves to step (35) in which the lowest of a set of unique 'region numbers' is allocated to the pixel. In subsequent iterations of the process the next highest region number is allocated each time step (35) is executed. After allocating a region number the processing moves to step (32).

However, if one or more adjacent, allocated pixels is found at step (34), the current pixel is allocated the lowest of the region numbers of the adjacent pixels in step (36); and then, in step (37), any adjacent pixels are tested to see if any of them have already been allocated a higher region number, and, in step (38), all other pixels that have been allocated that, higher, region number (regardless of adjacency) are re-allocated to the lower region number (i.e. the region number allocated to the current pixel).

Once all the pixels of the image have been assessed, the test at step (32) ends the process and all separate, discrete regions will have had their constituent pixels allocated to respective, unique region numbers.

Returning to FIG. 2, the correction-region data (207) is input to two edge analysers (208) and (209), that evaluate, for each identified correction region of the current image, respective edge-difference measures for the input pixels (201), and for the corrected pixels (203). The edge analysers (208) and (209) operate identically and analyse identical image regions as defined by the correction-region data (207). First, pixels at the periphery of the region are identified; these are pixels that have horizontally or vertically adjacent neighbours that are not part of the region being analysed. Secondly, the magnitude of the pixel-value difference(s) between each of the identified pixels and its respective horizontally or vertically adjacent neighbour(s) that are not part of the region are accumulated. The accumulated value for all the identified peripheral pixels of a region forms the edge-difference measure for that region. This measure is representative of the gradient at the edge of the region and will be referred to as the edge-value for the region in the following description.

Figure 4:
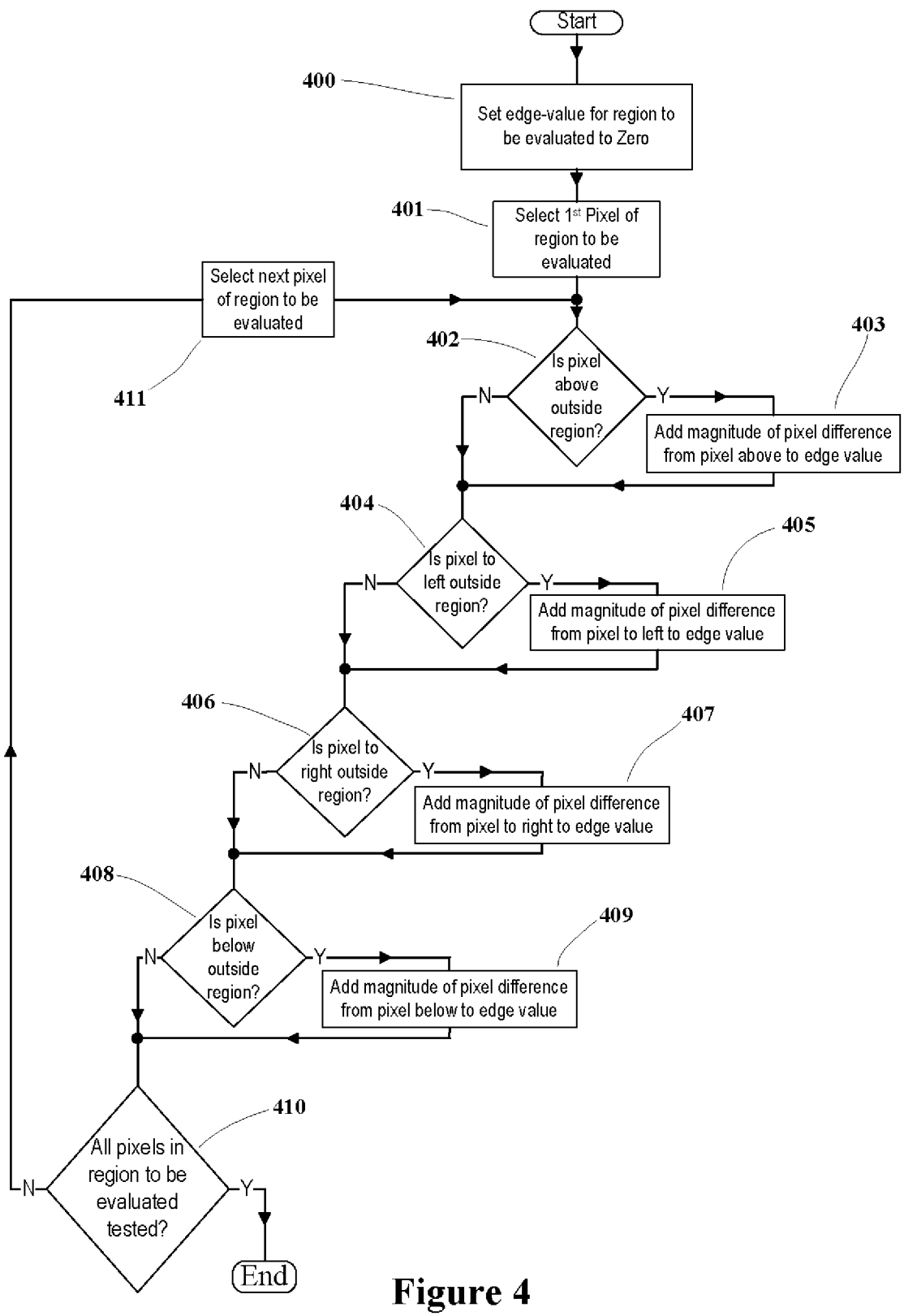
FIG. 4 shows a flow chart of a process for evaluating an edge-difference measure for a discrete image region.

FIG. 4 shows a flow chart of a suitable method of evaluating this measure for a particular region. The edge-value value for the region is initialised to zero in step (400), and then the contributions of each of the pixels that have been allocated to the region are evaluated in turn, and the contributions are accumulated to achieve a resulting edge-value.

The first pixel is selected in step (401), and in step (402) a test is made to see if the adjacent pixel above is outside the region (i.e. that it has not been allocated to the region being assessed). If the adjacent pixel above is outside the region, the pixel-value difference from the adjacent pixel above is calculated and its magnitude added to the edge-value accumulation in step (403). A similar test of the adjacent pixel to the left is made at step (404), and if the adjacent pixel to the left is outside the region, the magnitude of the pixel-value difference from the adjacent pixel to the left is added to the edge-value in step (405). The pixel to the right is tested at step (406), and if it is outside the region, the corresponding difference is added to the edge-value in step (407). Finally, the pixel below is tested at step (408), and if the pixel is outside the region, the magnitude of its difference value is added in step (409); and in step (410), a test is made to see if all the pixels comprising the region have been evaluated. If not, the next pixel is selected in step (411) and the evaluation process repeated. Once all the pixels of the region have been processed the total accumulated difference value is used to control the processing of that region as described below.

Returning to FIG. 2, if the correction process (202) has successfully corrected a particular region in a particular image, the edge-value corresponding to the original pixels of that region derived by the analyser (208) will be larger than the corresponding edge-value for the corrected pixels derived by the analyser (209). This is because the artefact, by definition, differs from its surrounding image pixels and therefore has a high edge-value; but if the artefact is removed by the correction process (202) the edges of the artefact are also removed.

If the correction process (202) mistakenly applies correction to an image area, the corrected area is likely to be different from its surrounding pixels, and this difference will contribute to the edge-value for that area as evaluated for the corrected image. However, the corresponding area of the uncorrected image is likely to have a lower edge-value because no 'artificial' pixel changes have been made.

For each correction-region identified by the pixel-comparator (204), an edge-value comparator (210) compares the respective edge-values from the edge analyser (208) and the edge analyser (209). The difference between the two edge-values represents a correction cost/benefit measure for that region. If the edge-value from the edge analyser (209) is larger than the edge-value from the edge analyser (208), then it can be assumed that the correction process (202) has impaired that image region. And similarly, if the edge-value from the edge analyser (209) is smaller than the edge-value from the edge analyser (208), then it can be assumed that the correction process (202) has improved that image region.

The result from the comparator (210) is used to control a changeover switch (211) that provides a stream of output pixels (212). Normally the switch (211) routes the corrected pixels from the correction process (202), delayed by a compensating delay (213), to the output (212). However, when the edge-value comparator (210) determines that the correction process (202) has impaired the relevant image area, it causes the switch (211) to route the input pixels (201) that comprise that image area, delayed by compensating delays (205) and (214), to the output (212).

The compensating delays (213) and (214) are chosen to ensure that the switch control signal from the edge-value comparator (210) and the inputs to the switch (211) are co-timed. Typically each of these compensating delays are equal to the sum of the propagation delay of the respective edge analysis process, (208) or (209), and the propagation delay of the comparison process (210). The delay of the edge analysis process is usually at least a whole video field or frame period because an artefact may, in principle, extend over the full image height.

There are a number of possible variations within the scope of the invention, some of which will now be described.

It may not be necessary to compare corrected pixels with uncorrected pixels in order to identify the regions whose edges require analysis. Some image correction processes derive a 'degree of impairment' measure for pixels or image regions and this measure may be used in place of the output from the comparator (204) in the system of FIG. 2. It may be helpful to compare this degree of impairment measure with a threshold, and use the result of that comparison to identify regions for edge analysis.

The spatial sampling structure of the image may not be orthogonal (as is the case in FIG. 1). It may be helpful to use diagonally adjacent pixels in determining the edge-value for an image region. And, pixels more distant from the edge may be used to determine an alternative measure of gradient at the periphery of a region. For example, a set of pixels forming a filter aperture whose extent includes the position of the edge may be used to find a local gradient at a position near the edge. A summation of these gradient values around a particular image region can be used to obtain the gradient measure for that region.

Pixel values other than luminance values may be used to identify corrected regions or to evaluate the gradient measure for a region. Chrominance differences could be used, or a combination of luminance and chrominance differences, such as taking the higher of the chrominance and luminance differences could be used.

Alternative methods of evaluating the gradient measures for regions can be used. For example, the pixels of the image to be evaluated can be assessed in turn in the sequence of a conventional raster scan, and when an edge pixel is encountered, the relevant edge difference value for that pixel added to the summation for the respective region.

The switch (211) in the system of FIG. 2 may be replaced by a cross-fader that outputs a weighted sum of corrected and uncorrected pixels, where the weights depend on a determined cost/benefit value for a region.

The invention need not be implemented as a streaming process; it may be implemented faster or slower than real-time, and may be performed on image files.

The invention may be applied to a sub-sampled image, including individual fields that describe spatially sub-sampled versions of a common frame.

The invention may be used to control the application a wide range of artefact correction processes. A simple example of a suitable dirt correction process for film-originated video material is to replace pixels in a current film frame that do not lie in the range of values bounded by the values of the equivalent pixels in the preceding and succeeding film frames by a value lying in the middle of that range.

The invention claimed is:

1. A method of correcting defects in a representation of an image, using an image processor, comprising the steps in the image processor of identifying pixels at the periphery of a region of the image, to which region an image correction process has been applied; evaluating a gradient measure at said pixels at the periphery; accumulating said gradient measure along the periphery to form a periphery gradient measure and controlling the application of said image correction process to that region in accordance with the periphery gradient measure in which the said periphery gradient measure is evaluated for a corrected image region and for the same region of the same image without correction and the application of image correction to that region is controlled by the result of a comparison between the said periphery gradient measure with and without correction.

2. A method according to claim 1 in which the said image correction process is inhibited in regions where the said periphery gradient measure for a corrected image would be higher than the said periphery gradient measure for the same region in the uncorrected image.

3. A method according to claim 1 in which the said periphery gradient measure is a sum along the periphery of pixel value magnitude differences between pixels at the edge of the said region and respective adjacent pixels outside the said region.

4. A method according to claim 1 in which the said correction process is a process that corrects artefacts due to film dirt.

5. Apparatus for correcting defects in a representation of an image, the apparatus comprising an image correction unit receiving an image input; a periphery analysis unit for identifying the periphery of a region of the image which has been corrected in the image correction unit and for evaluating a periphery gradient measure for said region with and without correction, in which the application of correction to that region in an image output is controlled by the result of a comparison between the said measure with correction and the said measure without correction.

6. Apparatus according to claim 5 in which the said image correction unit is inhibited in regions where the said periphery gradient measure for a corrected image would be higher than the said measure for the same region in the uncorrected image.

7. Apparatus according to claim 5 in which the said periphery gradient measure is a sum along the periphery of pixel value magnitude differences between pixels at the edge of the said region and respective adjacent pixels outside the said region.

8. Apparatus according to claim 5 in which the said correction process is a process that corrects artefacts due to film dirt.

9. A non-transitory computer program product comprising instructions adapted to cause programmable apparatus to implement a method comprising the steps of provisionally correcting a region of an image to remove dirt or other defect; evaluating an accumulated gradient measure along the periphery of the region with and without correction; and choosing whether or not to use the corrected region depending on a comparison of the gradient measures.

* * * * *